United States Patent
Horvath et al.

(10) Patent No.: US 9,869,455 B2
(45) Date of Patent: Jan. 16, 2018

(54) ADJUSTABLE LUMINAIRE FOR SELECTIVELY CONTROLLING UPLIGHT/DOWNLIGHT RATIO

(71) Applicant: General Electric Company, Schenectady, NY (US)

(72) Inventors: Katalin Eszter Horvath, Lachine (CA); Mathew L Sommers, East Cleveland, OH (US); Sebastien Magnan, Lachine (CA)

(73) Assignee: GE LIGHTING SOLUTIONS, LLC, East Cleveland, OH (US)

( * ) Notice: Subject to any disclaimer, the term of this patent is extended or adjusted under 35 U.S.C. 154(b) by 123 days.

(21) Appl. No.: 14/956,582

(22) Filed: Dec. 2, 2015

(65) Prior Publication Data
US 2017/0159913 A1  Jun. 8, 2017

(51) Int. Cl.
F21V 14/02 (2006.01)
F21S 10/00 (2006.01)
F21V 8/00 (2006.01)
F21V 14/04 (2006.01)

(52) U.S. Cl.
CPC ............ *F21V 14/02* (2013.01); *F21S 10/005* (2013.01); *F21V 14/04* (2013.01); *G02B 6/0035* (2013.01); *G02B 6/0055* (2013.01); *G02B 6/0076* (2013.01); *G02B 6/0081* (2013.01); *G02B 6/0091* (2013.01)

(58) Field of Classification Search
CPC .......... F21V 14/02; F21V 14/04; F21V 21/14; F21V 2200/20; G02B 6/0035; G02B 6/0055; G02B 6/0076; G02B 6/0081; G02B 6/0011; G02B 6/0018; G02B 6/0091; G02B 6/0021; G02F 1/133615; F21S 10/005
See application file for complete search history.

(56) References Cited

U.S. PATENT DOCUMENTS

| | | | |
|---|---|---|---|
| 4,949,489 A | 8/1990 | Rudell et al. | |
| 6,478,454 B1 | 11/2002 | Jaffari et al. | |
| 7,329,026 B1 | 2/2008 | Hayman et al. | |
| 8,783,898 B2 | 7/2014 | Coleman et al. | |
| 8,789,993 B2 | 7/2014 | Vissenberg et al. | |
| 8,833,969 B2 | 9/2014 | Speier et al. | |
| 8,833,996 B2 | 9/2014 | Dau et al. | |
| 8,840,275 B2 * | 9/2014 | Parker .................. | G02B 6/0035 362/281 |

(Continued)

FOREIGN PATENT DOCUMENTS

EP 2469313 A1 6/2012

OTHER PUBLICATIONS

European Search Report and Opinion issued in connection with corresponding EP Application No. 16200845.2 dated Mar. 30, 2017.

*Primary Examiner* — Bao Q Truong
(74) *Attorney, Agent, or Firm* — Peter T. DiMauro; GE Global Patent Operation

(57) ABSTRACT

Provided is an adjustable lighting system, configured to emit light at any of various bi-directional light-emission ratios. The adjustable lighting system includes a light source, and a reflective component positioned adjacent the light source. The adjustable lighting system also includes a movable positioning apparatus connected to the light source or the reflective component and configured to, when moved, change a relative positioning between the light source and the reflective component.

19 Claims, 5 Drawing Sheets

(56) References Cited

U.S. PATENT DOCUMENTS

| | | | |
|---|---|---|---|
| 9,223,082 B2 * | 12/2015 | Chi | ............... G02B 6/0013 |
| 9,599,765 B2 * | 3/2017 | Krishnaswamy | ...... G02B 6/006 |
| 2012/0236590 A1 | 9/2012 | Parker et al. | |

* cited by examiner

ADJUSTABLE LUMINAIRE FOR SELECTIVELY CONTROLLING UPLIGHT/DOWNLIGHT RATIO

TECHNICAL FIELD

The present technology relates generally to adjustable light systems and, more particularly, to adjustable luminaires for selectively controlling uplight/downlight ratio from the luminaire.

BACKGROUND

Preferred indoor lighting features depends on room characteristics such as size and color. Lighting is also affected by positioning of the luminaire(s), such as height of an edgelit luminaire in a room.

Edgelit luminaires are configured to deliver light upward and downward at a single up/downlight ratio. These systems are thus limited to providing only one pre-defined direct/indirect lighting quality. An example ratio is fifty percent uplight, fifty percent downlight.

A generally fifty/fifty (50%/50%), or half-half, up/down luminaire could produce ideal lighting for a particular room characteristic (e.g., size, or color) and luminaire positioning. If the room has other characteristics, and/or the luminaire must be positioned otherwise, such as for architectural or decorating reasons, the same luminaire will not produce ideal lighting.

In some cases, re-positioning the luminaire can improve the lighting. This is not possible in all cases, though. When possible, the re-positioning may require a good amount of work (cost), and still the resulting position may not be preferred from an architectural or design standpoint.

Another option, when a particular edgelit luminaire and luminaire positioning are not conducive for a particular room, is to obtain a different luminaire, with its added cost.

A designer looking to use luminaires in each of twenty different rooms of a building, for instance, may need to purchase twenty different types of edgelit luminaires, which can be much more expensive than ordering the same type in bulk. Or a basic renovation of a room having edgelit luminaires can require purchase of new luminaires.

Still another option, when a particular edgelit luminaire and luminaire positioning are not conducive for a particular room, is to use baffles or plates to block select amounts of up and/or down light from a fixed ratio luminaire to change the uplight/downlight ratio effectively. This arrangement, though, has negative impacts on optical efficiency. Less light is emitted from the system, for instance, representing wasted energy and usually less than idea lighting from the lumen power available for the fixture.

SUMMARY OF THE EMBODIMENTS

Given the aforementioned deficiencies, there is a need for adjustable lighting systems capable of emitting light at any of various bi-directional light-emission ratios, depending on how the lighting systems are set.

There is a need, for instance, for adjustable edgelit luminaires capable of providing various uplight/downlight ratios. The uplight/downlight ratio can be referred to by a variety of other terms, such as up/downlight ratio, up/down light ratio, up/down light-emission ratio, uplight/downlight light-emission ratio, or the like. The edgelit luminaire is configured to be mechanically adjusted to change the uplight/downlight ratio as desired.

Generally, the ratio represents an amount of light that is emitted upward by the adjustable luminaire, such as toward a room ceiling, as compared to an amount of light that is emitted at the same time downward, toward a floor or ground.

The edgelit luminaire is configured to be set selectively to provide light at any of two or more various uplight/downlight ratios. The different ratios are achieved by changing a relative positioning between a light-emitting structure (LES) of the luminaire and a reflective component. In some embodiments, the luminaire includes at least one of first and second—e.g., upper and lower—lightguides.

In some cases the lightguides are arranged in the luminaire to maintain a static relative positioning with the reflective component. In these cases, the different ratios can be viewed as being achieved by changing a relative positioning between the light-emitting structure (LES) of the luminaire and the reflective component or between the light-emitting structure (LES) of the luminaire and the lightguide(s).

While the present technology is described primarily with respect to an adjustable lateral-edgelit luminaire for selectively providing any of multiple uplight/downlight ratios, contemplated embodiments allow edgelighting from angles other than from the side, and corresponding adjustments. Instead of being configured to adjust an uplight/downlight ratio, the system can be configured to adjust other bi-directional light-emission ratios, such as a left-light/right-light ratio.

The technology can be implemented, for instance, in an adjustable toplit (or bottomlit) luminaire whereby the LES is movable (e.g., laterally movable) to control a right/left lighting ratio. While this embodiment is not shown in detail, it is can include any of the features described and shown herein with respect to lateral-edge lighting, except that the luminaire would be rotated ninety degrees clockwise or counterclockwise.

Further features and advantages, as well as the structure and operation of various embodiments, are described in detail below with reference to the accompanying drawings. The technology is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS

Exemplary embodiments may take form in various components and arrangements of components. Exemplary embodiments are illustrated in the accompanying drawings, throughout which like reference numerals may indicate corresponding or similar parts in the various figures. The drawings are only for purposes of illustrating preferred embodiments and are not to be construed as limiting the technology. Given the following enabling description of the drawings, novel aspects of the present technology will be evident to a person of ordinary skill in the art.

DETAILED DESCRIPTION OF THE EMBODIMENTS

While exemplary embodiments are described herein with illustrative embodiments for particular implementations, it should be understood that the technology is not limited thereto. Those skilled in the art with access to the teachings provided herein will recognize additional modifications, applications, and embodiments within the scope thereof, and additional fields in which the adjustable luminaire described herein would be of significant utility.

References herein to how a feature is arranged can refer to, but are not limited to, how the features is positioned with respect to other features. References herein to how a feature is configured can refer to, but are not limited to, how the feature is sized, shaped, and/or material of the feature. For simplicity, the term configured can be used to refer to both the configuration and arrangement described above in this paragraph.

A. Example Structure of a First Adjustable Luminaire—FIG. 1

Figure 1:
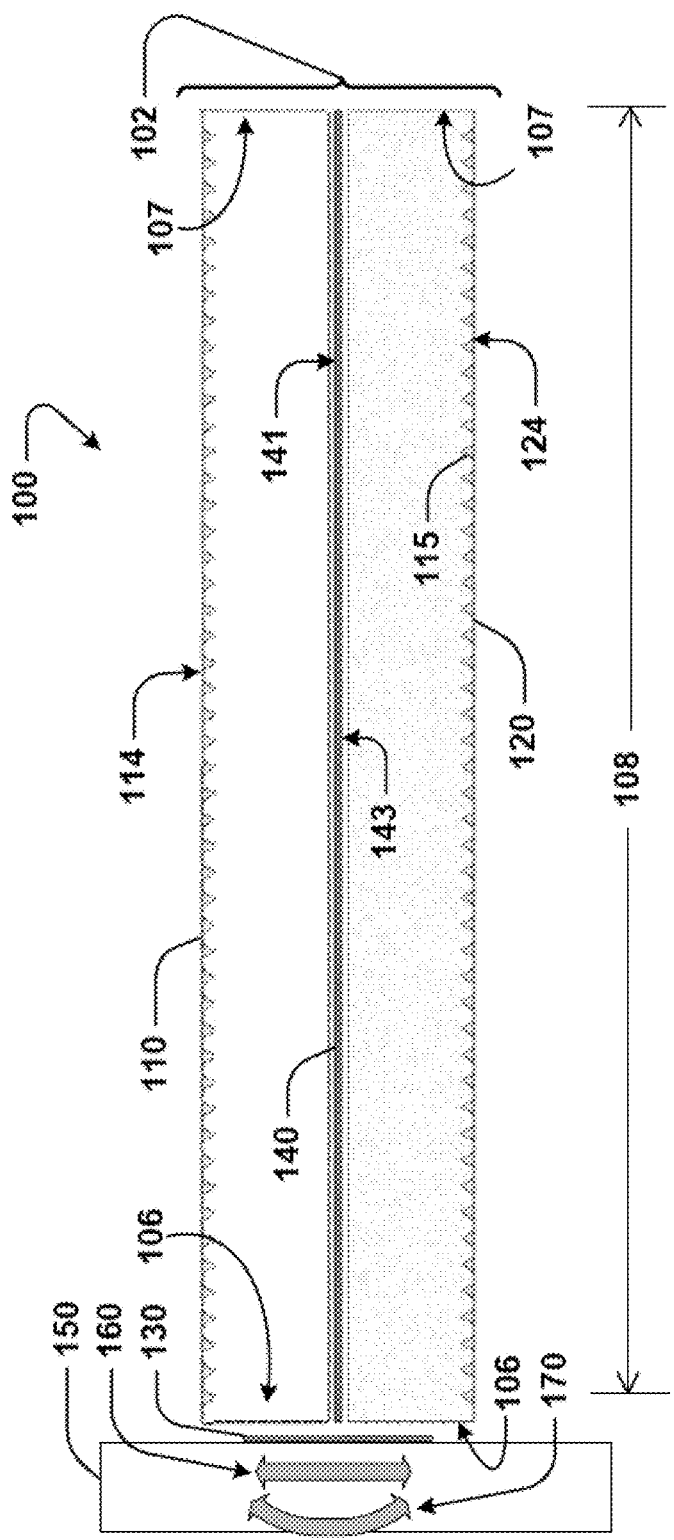
FIG. 1 illustrates an adjustable edgelit luminaire according to a dual-waveguide embodiment of the present technology, in a first orientation.

FIG. 1 is an illustration of an example adjustable edgelit luminaire 100. While an edgelit luminaire 100 is shown for teaching purposes, the present technology is not limited for implementation with edgelight luminaires.

The luminaire 100 includes a light-guide component or body 102. The light-guide body 102 includes an upper lightguide, or waveguide, 110, and a lower lightguide, or waveguide 120. The lightguides 110, 120 are positioned adjacent a light emitting source (LES) 130, such as an array of light emitting diodes.

The upper lightguide 110 can be referred to by other names, such as uplight, and the lower lightguide 120 can be referred to by other names such as downlight.

The lightguides 110, 120 can include any suitable material and shape for propagating light from the LES 130 as desired. In some embodiments, the lightguides 110, 120 include a plastic, and can be referred to as plastic sheets.

The light-guide body 102 includes proximate edges 106 (an upper one, of the upper lightguide 110, and a lower one, of the lower lightguide 120) configured to allow light to pass from the LES 130 into the lightguides 110, 120. As shown by way of example in FIGS. 2-4, the light is transmitted through one or both of the lightguides 110, 120, along a length 108 of the body 102, until it is emitted from the luminaire 100 by way of an upper surface 114, of the upper lightguide 110, or a lower surface 124, of the lower lightguide 120.

Distal edges 107 of the light-guide body 102 (one of the upper lightguide 110 and one of the lower lightguide 120), opposite the proximate edges 106, can be configured in any of a variety of ways to affect as desired any light reaching the distal edge 107. The distal edge 107 can be opaque, such as by being painted, taped, or capped to inhibit light emission by way of the distal edge, or can be configured to let all or some of light reaching the distal edge 107 passing straight through.

The surfaces 114, 124 can be configured in any of variety of ways to promote desired quality of light emission from the luminaire 100. The surfaces 114, 124 can be etched for instance, or otherwise configured to affect light passing through them, as indicated generally and schematically by reference numeral 115 in FIG. 1. Or one or both of the opposing light-emitting surfaces can be generally smooth, as shown for analogous light-emitting surfaces 514, 524 of an embodiment shown in FIG. 5.

The light-guide body 102 also includes an intermediate component 140 having two opposing reflective sides 141, 143. The intermediate component 140 can be referred to by a variety of names, such as a separator, reflector, reflecting wall, reflecting interface, reflective sheet, reflecting component, interface, or sheet, reflective component, the like, or other. The part 140 will be referred to primarily as a reflective component herein.

The reflective component 140 is configured and arranged in the luminaire 100 to affect light impinging on the reflective component 140 in one or more desired ways. In some embodiments, the reflective component 140 is reflective and shaped as a sheet, panel, film, or the like.

Generally, the reflective component 140 is configured and arranged between the lightguides 110, 120 to keep—e.g., block by reflection—light emitted from the LES 130 and passing through one of the lightguides 110, 120, from passing into the other lightguide 120, 110. In this way, light passing through either lightguide 110, 120 does not couple with light passing through the other lightguide 120, 110.

The reflective component 140 can include any suitable material and shape for reflecting light as desired. The reflective component 140 can be double-reflective—i.e., reflective at each opposing sides of the component 140. In some embodiments, the reflective component 140 includes any of reflective plastic, reflective metal (e.g., aluminum), and reflective paper. Surface material of the reflective component 140 can configured to promote specular or diffuse reflection.

In various contemplated embodiments (not shown in detail), the luminaire 100 does not include one or both of the lightguides 110, 120 illustrated.

In various contemplated embodiments (not shown in detail), the LES 130 is not an edgelight, but rather positioned at a location other than an extreme edge of the reflector. The light can be positioned between portions of the reflector, for instance, such as through a hole in the reflector.

The luminaire 100 is shown in a first orientation in FIG. 1. The first orientation may be referred to by other names such as a first state, a standard state or orientation, a home state or orientation, the like or other. In the first, or home, orientation, the LES 130 is centrally positioned with respect to the up and down lightguides 110, 120.

Positioning of the LES 130 with respect to the lightguides 110, 120 controls an uplight/downlight ratio of the luminaire 100. The uplight/downlight ratio represents an amount of light, or lumens, being delivered by an upper portion, corresponding to the upper lightguide 110, of the luminaire 100 as compared to an amount of light, or lumens, being delivered by a lower portion, corresponding to the lower lightguide 120, of the luminaire 100.

The luminaire 100 provides light at a higher uplight/downlight ratio as more light is delivered by way of the upper lightguide 110 with respect to the amount of light being delivered by way of the lower lightguide 120. And vice versa, —i.e., the luminaire 100 provides light at a lower uplight/downlight ratio when less light is delivered by way of the upper lightguide 110 with respect to the amount of light being delivered by way of the lower lightguide 120.

It is contemplated that the amount of light being delivered by way of the upper and lower lightguides 110, 120 can also be compared by a converse ratio—a downlight/uplight ratio. The luminaire 100 provides light at a lower downlight/uplight ratio as more light is delivered by way of the upper lightguide 110 with respect to the amount of light being delivered by way of the lower lightguide 120. And vice versa, —i.e., the luminaire 100 provides light at a higher downlight/uplight ratio when less light is delivered by way of the upper lightguide 110 with respect to the amount of light being delivered by way of the lower lightguide 120.

While either of the ratios (up/downlight ratio, or down/uplight ratio) can be used, by designers or users of the luminaire 100, the uplight/downlight ratio is referred to primarily herein for simplicity.

The luminaire 100 comprises a movable positioning apparatus 150 configured and arranged in the system to change a relative positioning between the LES 130 and the reflective component 140. In various embodiments, the movable positioning apparatus 150 is connected to the LES 130 for moving the LES 130 to change the relative positioning between the LES 130 and the lightguides 110, 120. While these embodiments are described primarily herein, in some embodiments (not shown in detail for simplicity of disclosure), the positioning apparatus 150 is connected to at least one of the lightguides 110, 120 for moving one or both lightguides 110, 120 to change the relative positioning between the LES 130 and the lightguides 110, 120.

Figure 2:
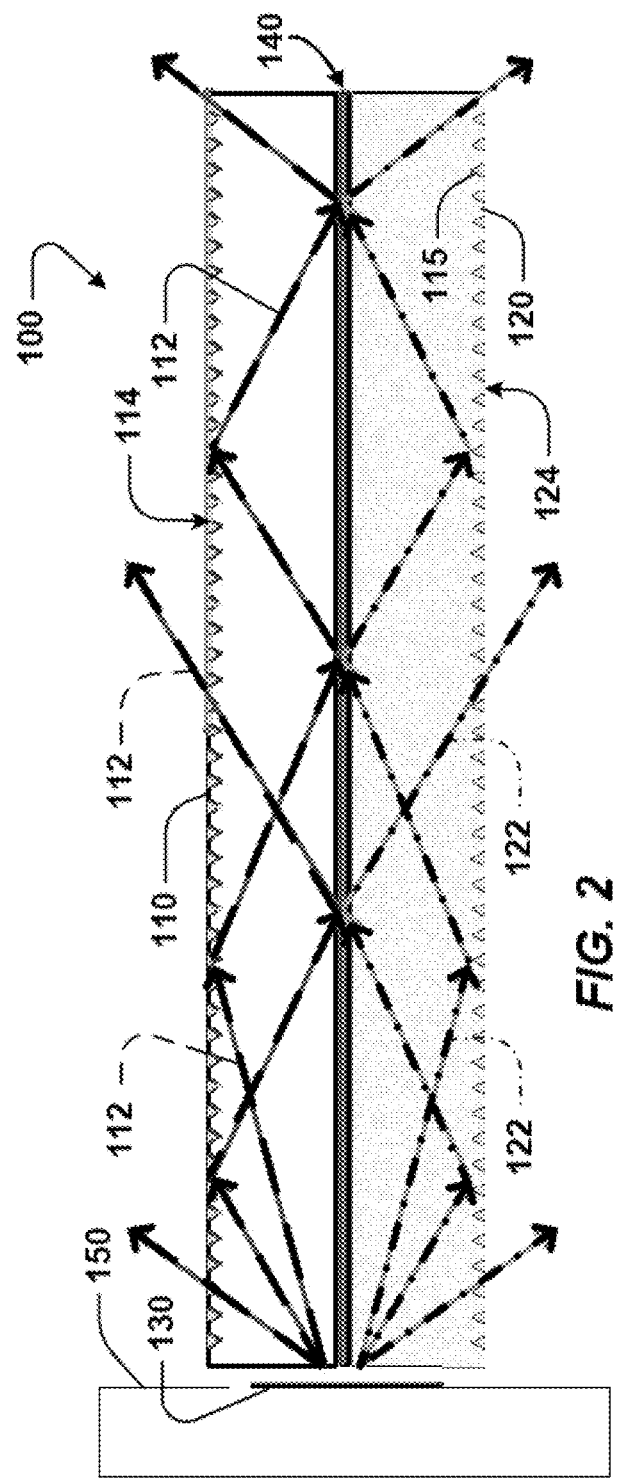
FIG. 2 shows the adjustable edgelit luminaire of FIG. 1 in the first orientation and illuminated.
Figure 3:
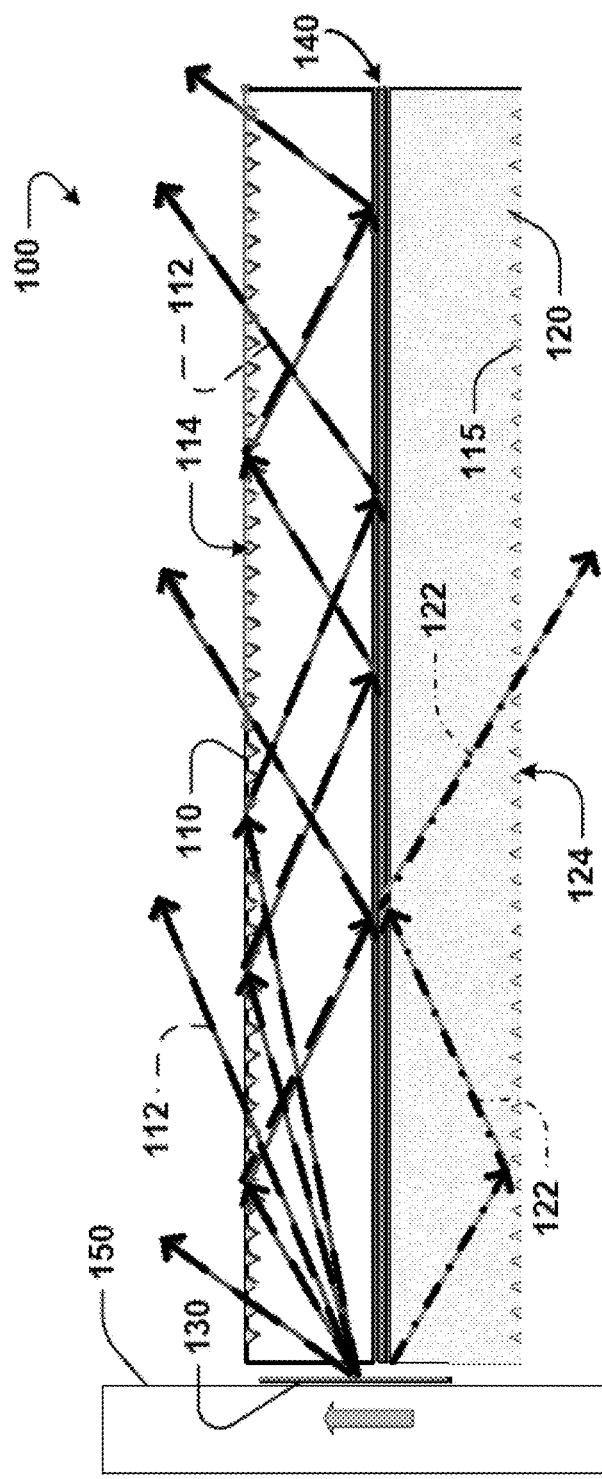
FIG. 3 shows the adjustable edgelit luminaire of FIG. 1 illuminated in a second orientation, providing a higher up/down light ratio.

Positioning of the LES 130 with respect to the lightguides 110, 120 is controlled by adjustment of the positioning apparatus 150, shown schematically in FIGS. 1-3. The positioning apparatus 150 can have any of a wide variety of configurations without departing from the scope of the present technology.

The positioning apparatus 150 is in some embodiments configured to be electrically actuated. The positioning apparatus 150 can be connected to a switch, button, or computing controller that a remote or local computing system or person can trigger desired movement of the positioning apparatus 150 to change to the uplight/downlight ratio as desired.

In various embodiments (not shown in great detail to simplify the disclosure), the positioning apparatus 150 is arranged and connected to the LES 130 to move the LES generally linearly—e.g., up/down, left/right, or other bi-direction. The motion is indicated generally and schematically in FIG. 1 by reference numeral 160.

The arrangement can include, for instance, a rack-and-pinion arrangement whereby the positioning apparatus comprises a pinion, or gear, that when turned pushes the LES 130, comprising a rack, upward or downward accordingly.

Or the arrangement can include a slide. The positioning apparatus 150 can include a guide track connected slidably with a rail or slide connected to the LES 130 or reflective component 140 to change a relative positioning between the LES 130 and reflective component 140. Or the positioning apparatus 150 can include the slide and the guide track can be connected to the LES 130 or reflective component 140 for setting a relative positioning between the LES 130 and reflective component 140 as desired.

In another contemplated embodiment (not shown in detail to simplify the disclosure), the positioning apparatus 150 comprises an incremental-position locking mechanism, such as by including a plurality of positioning magnets, hooks, slots, orifices, recepticales or other elements capable of connecting temporarily to a mating element connected to the LES 130. The positioning elements can be vertically arranged for instance, such that the LES 130 can be positioned at any of multiple corresponding heights by connecting the mating element of the LES 130 to the positioning elements of the positioning apparatus 150.

In still another contemplated embodiment (not shown in great detail), like the last embodiment described, the positioning apparatus 150 comprises the mating element and the LES 130 is connected to a plurality of positioning elements. The positioning elements are vertically arranged with respect to the LES such that the LES 130 can be positioned at any of multiple corresponding heights by connecting the mating element of the positioning apparatus 150 to the positioning elements of the LES 130.

In another contemplated embodiment (not shown in great detail), similar in ways to the last embodiment described, the positioning apparatus 150 comprises the mating element and the LES 130 is connected to a plurality of positioning elements. The positioning elements are vertically arranged with respect to the LES such that the LES 130 can be positioned at any of multiple corresponding heights by connecting the mating element of the positioning apparatus 150 to the positioning elements of the LES 130.

The arrangement can be structured so that the LES 130 can be moved to any of multiple pre-set heights. The pre-set heights can correspond, for instance, to selectable slots.

And/or the arrangement can be structure so that the LES 130 can be moved to virtually any position between a maximum (e.g., highest) position, or height, and a minimum (e.g., lowest) position or height. In this case, then, the LES 130 can be moved to, effectively, an infinite number of lighting positions—i.e., infinite different up/downlight ratios.

In a contemplated embodiment, the luminaire 100 is configured so that relative positioning between the LES 130 and the lightguides 110, 120 is accomplished by moving the lightguides 110, 120.

In various embodiments (not shown in detail), the positioning apparatus 150 is arranged and connected to the LES 130 to rotate the LES 130.

In various embodiments, for example, the LES 130 includes various lights in various parts to effect different up/downlight ratios, depending on which parts are positioned where with respect to the reflective component 140.

For instance, more lighting element(s) (e.g., more LED rows of an LED board, or a larger array, providing, for instance, 70% of total LES light) can be positioned toward a top of the LES 130 and less (providing, for instance, the other 30% of total LES light) toward a bottom of the LES 130.

In contemplated embodiments, along with having more or less lighting elements, or instead of having more or less lighting elements, the LES 130 comprises other distinguishing lighting features from part to part, such as by having stronger and weaker lighting element(s) in various parts, or having lighting elements of different hues or colors in various parts.

The LES 130 and positioning apparatus 150 are configured and arranged (e.g., connected) so that the orientation of the LES 130 can be rotated. The motion is indicated generally and schematically in FIG. 1 by reference numeral 170. While the arrow 170 is shown bending slightly left and right, the rotation need not include that trajectory. In embodiments, it is preferred that the rotation indicated by the arrow 170 be made while keeping the LES 130 in the same plane that it is shown in.

The LES 130 can be configured and arranged to be rotated 180 degrees, for instance, such as by the LES being flipped with respect to the lightguides 110, 120. After the rotation one part of the LES (e.g., a part with more LEDs) will be positioned vertically lower on the LES 130, adjacent the lower lightguide 120, and another, different part (having, e.g., less LEDs) will be positioned higher on the LES 130, adjacent the upper lightguide 110.

In another contemplated embodiment (not shown in detail), similar in ways to the last described embodiment, in which the LES 130 comprises two sections having different light-emitting characteristics, the LES 130 comprises three or more various sections having different light-emitting characteristics. The LES 130 can have a dial formation, for instance, and be arranged adjacent the lightguides 110, 120 in connection with the positioning apparatus 150 so that rotating the positioning apparatus 150 to one of multiple pre-set positions turns the LES 130 to corresponding pre-set positions.

In one embodiment, the movable apparatus is configured to be readily removed (e.g., snapped off, or by pulling magnets apart) from a first position at the luminaire 100 and readily returned to a second position (e.g., by snap or magnet), such as to a position being 180 degrees distinct from the first position.

At each position, different amounts of light of are provided through the upper lightguide 110 and the lower lightguide 120, resulting thus in various corresponding uplight/downlight ratios.

In another contemplated embodiment, the LES 130 has a varying distribution of lighting characteristics and connected to a movable positioning apparatus 150 so that moving (e.g., rotating) the positioning apparatus 150 moves the LES 130 to a corresponding position, providing a corresponding amount and/or type of light to the upper lightguide 110 and a distinct amount of light to the lower lightguide.

While two primary LES 130 parts are described primarily, functioning in one of two positions being 180 degrees apart, the LES 130 can have more than two areas, such as by having four areas whereby two are used at a time depending on user selective positioning of the LES 130 with respect to the reflective component 140 in any of four relative positionings being 90 degrees apart.

In some implementations, the arrangement is structured (e.g., with selectable slots) so that the LES 130 can be rotated to any of multiple pre-set positions. The positions can be marked by slots, protrusions, depressions, any suitable structure on the LES 130 and positioning apparatus 150 for keeping the LES in place with respect to the lightguides 110, 120 until the LES 130 is moved again.

In another implementation, the LES 130 can be rotated to any position between points (e.g., any position around a 360 degree range), so that an infinite number of lighting combinations—i.e., infinite different up/downlight ratios—can be achieved by positioning the LES 130 in any of infinite positions in the range.

B. Example Illumination in the First Orientation—FIG. 2

FIG. 2 shows the adjustable edgelit luminaire 100 in the first orientation and illuminated. Light travelling through the upper lightguide 110 is labeled by reference numeral 112. Light travelling through the lower lightguide 120 is labeled by reference numeral 122.

As shown, with the LES 130 positioned generally centrally with respect to the upper and lower lightguides 110, 120, approximately half of the light emitted from the LES 130 will propagate through the upper lightguide 110 and approximately half will propagate through the lower lightguide 120.

As also shown in FIG. 2, the reflective component 140 keeps light passing through the upper lightguide 110 from entering the lower lightguide 120, and vice versa.

For implementations in which generally equal amounts of lumen is desired from the top and bottom of the luminaire, the adjustable edgelit system 100 is positioned in the first orientation of FIGS. 1 and 2.

C. Example Illumination in a Second Orientation—FIG. 3

FIG. 3 shows the adjustable edgelit luminaire 100 in a second example orientation and illuminated. For the second orientation, the LES 130 is offset from the central position of the first orientation of FIG. 1 and, more particularly, is positioned higher than the LES 130 is positioned for the first orientation.

As shown schematically in FIG. 3, with the LES 130 positioned higher, more light from the LES 130 enters the upper lightguide 110 than enters the lower lightguide 120. And again, the reflective component 140 keeps light passing through the upper lightguide 110 from entering the lower lightguide 120, and vice versa.

The up/downlight ratio is increased in proportion to the increase in height of the LES 130 with respect to the lightguides 110, 120.

In some arrangements, the luminaire 100 is configured such that no light, very little light, or generally no light is provided by way of the lower lightguide 120 when the LES 130 is positioned at a maximum height with respect to the lightguides 110, 120.

D. Example Illumination in a Third Orientation—FIG. 4

Figure 4:
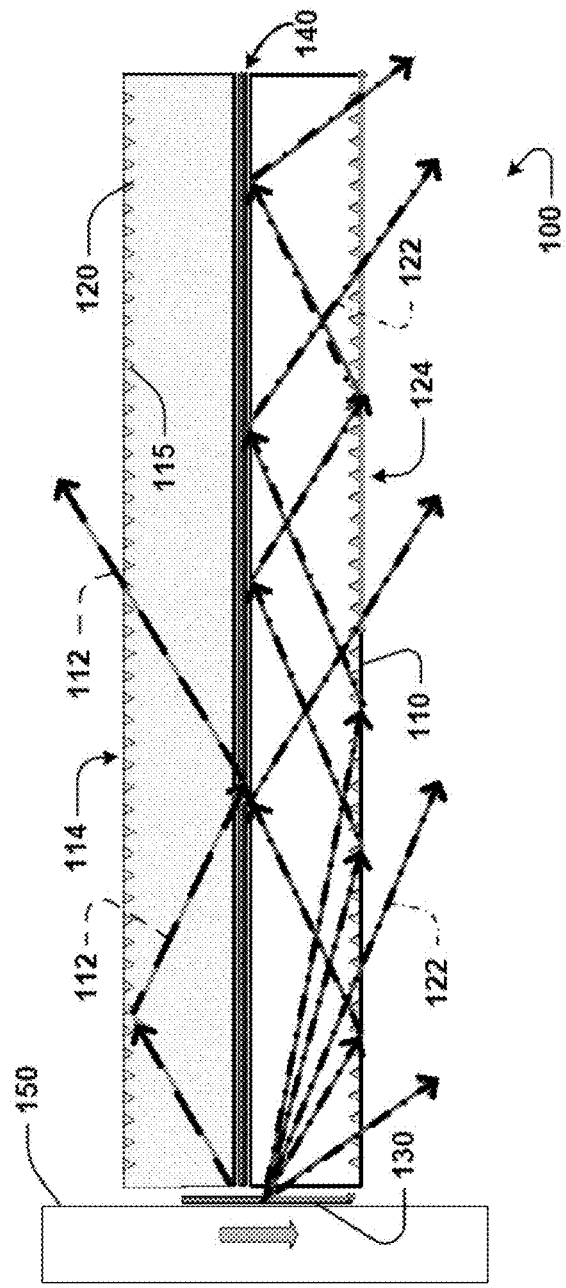
FIG. 4 shows the adjustable edgelit luminaire of FIG. 1 illuminated in a third orientation, providing a lower up/downlight ratio.

FIG. 4 shows the adjustable edgelit luminaire 100 in a third example orientation and illuminated. For the third orientation, the LES 130 is offset from the central position of the first orientation of FIG. 1 and, more particularly, is positioned lower than the LES 130 is positioned for the first and second orientations, of FIGS. 1 and 2.

As shown schematically in FIG. 4, with the LES 130 positioned lower, more light from the LES 130 enters the lower lightguide 120 than enters the upper lightguide 110. And again, the reflective component 140 keeps light passing through the upper lightguide 110 from entering the lower lightguide 120, and vice versa.

The up/downlight ratio is lowered in proportion to the decrease in height of the LES 130 with respect to the lightguides 110, 120.

In some arrangements, the luminaire 100 is configured such that no light, very little light, or generally no light is provided by way of the upper lightguide 110 when the LES 130 is positioned at a minimum height with respect to the lightguides 110, 120.

E. Example Structure of a Second Adjustable Luminaire—FIG. 5

Figure 5:
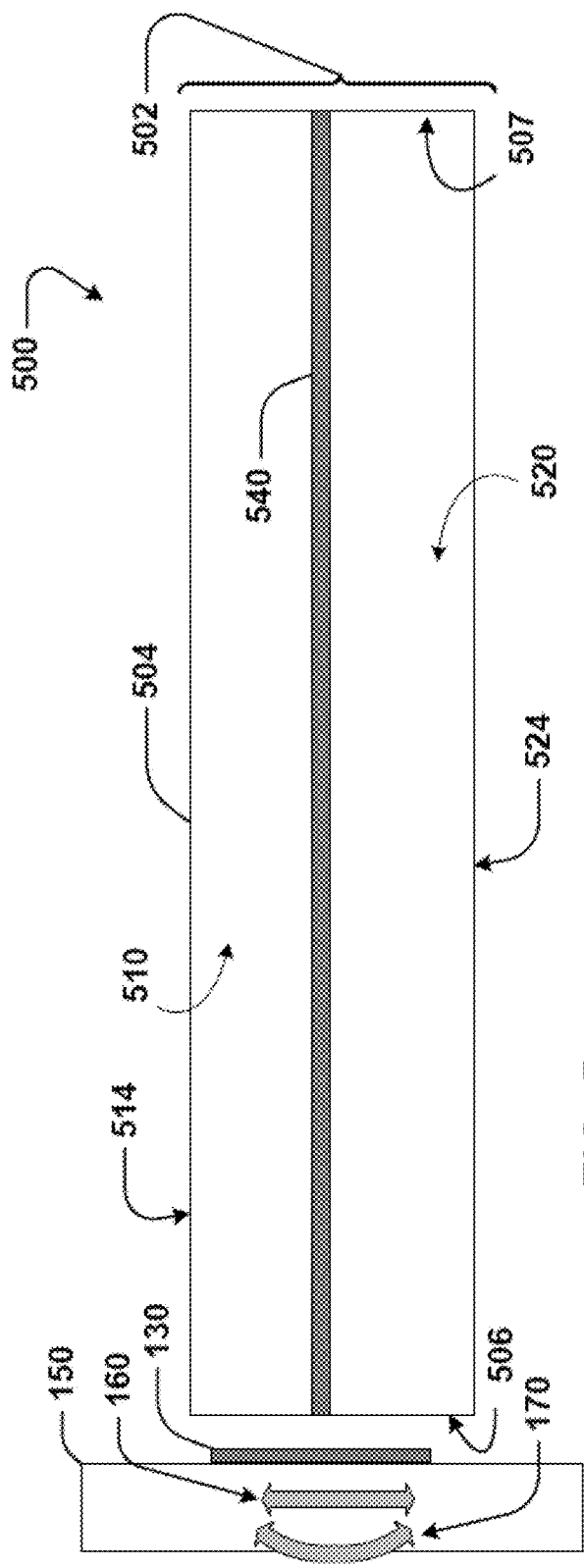
FIG. 5 illustrates an adjustable edgelit luminaire according to a unitary-waveguide embodiment of the present technology.

FIG. 5 illustrates an adjustable edgelit luminaire 500 according to a unitary-waveguide embodiment of the present technology.

The luminaire 500 comprises a unitary lightguide component or body 502. The unitary lightguide body 502 includes a primary or base light-guide material 504 and, positioned (e.g., formed) therein, a reflective material 540.

The reflective material 540 can be referred to by other names, such as a reflective component, and can be formed as a double-reflective sheet—i.e., reflective on opposing sides. In some embodiments, the reflective component 540 includes any of reflective plastic, reflective metal (e.g., aluminum), and reflective paper. Surface material of the reflective component 140 can configured to promote specular or diffuse reflection.

While the base light-guide material 504 can be formed around any or all edges of the reflective material separates, such as to partially or completely surround the reflective material 540, the reflective material 540 generally separates the base light-guide material 504 into two portions—an upper portion 510 and a lower portion 520.

The unitary lightguide body 502 includes a proximate edge 506 configured to allow light to pass from the LES 130 into the unitary lightguide body 502. Light is transmitted through the base light-guide material 504 of the unitary lightguide body 502, on either side of the reflective material 540, in generally the same manner provided with respect to the first example luminaire 100, of FIGS. 1-4. For instance, the light is transmitted through the upper and/or lower portions 510, 520, with light impinging on the reflective material 540 reflecting accordingly, until all of the light is emitted, such as by way of the upper or lower surface 514, 524.

A distal edge 507 of the light-guide body 502, opposite the proximate edge 506, can be configured like the distal edges 107 described above in connection with the first example luminaire 100 of FIG. 1.

The unitary lightguide body 502 can be formed to include the base light-guide material 504 positioned with the reflective material 540 in any of a variety of ways. In one embodiment, the unitary lightguide body 502 is formed a co-extrusion process by which the reflecting material 540 is formed within the base light-guide material 504.

The unitary lightguide body 502 of FIG. 5 is positioned adjacent a light emitting source (LES) 130, such as an array of light emitting diodes, like the lightguide body 102 is positioned adjacent the LES 130 in FIG. 1.

While the luminaire 500 of FIG. 5 is illustrated having a generally horizontal layout, for controlling the uplight/downlight ratio, the luminaire 500 can be arranged at other angles, such as turned 90 degrees for controlling a right-light/left-light ratio, as also described with respect to the first example luminaire 100.

The configuration, arrangement, and functions of the second example luminaire 500 of FIG. 5 can otherwise be similar or the same as the corresponding configuration, arrangement, and functions of the first example luminaire 100 described above in connection with FIGS. 1-4, and so is not described further here.

Alternative embodiments, examples, and modifications that would still be encompassed by the technology may be made by those skilled in the art, particularly in light of the foregoing teachings. Further, it should be understood that the terminology used to describe the technology is intended to be in the nature of words of description rather than of limitation.

Those skilled in the art will also appreciate that various adaptations and modifications of the preferred and alternative embodiments described above can be configured without departing from the scope and spirit of the technology. Therefore, it is to be understood that, within the scope of the appended claims, the technology may be practiced other than as specifically described herein.

What we claim is:

1. An adjustable lighting system, configured to emit light at any of various bi-directional light-emission ratios, comprising:
    a reflective component;
    a light source positioned adjacent the reflective component; and
    a movable positioning apparatus connected to the light source or the reflective component;
    wherein the movable positioning apparatus is configured to, when moved, change a relative positioning between the light source and the reflective component;
    wherein the adjustable lighting system further comprises a lightguide component having a first emitting surface and a second emitting surface opposite the first emitting surface, wherein the reflective component is positioned between the first and second emitting surfaces and the lightguide is positioned adjacent the light source and configured to, in operation of the adjustable lighting system, transmit received light out of the adjustable lighting system by way of the first emitting surface and the second emitting surface.

2. The adjustable lighting system of claim 1 wherein:
    the reflective component is positioned laterally adjacent at least a portion of the light source; and
    the movable positioning apparatus is configured and arranged in the adjustable lighting system to, when moved, change a relative vertical positioning between the light source and the reflective component, for the adjustable lighting system to emit light at a different one of the various bi-directional light-emission ratios being up/down light-emission ratios.

3. The adjustable lighting system of claim 2 wherein the movable positioning apparatus comprises an incremental-position locking mechanism, a slide mechanism, or a rack-and-pinion mechanism, configured to move the light source or the reflective component vertically to change the relative vertical positioning between the light source and the reflective component for the adjustable lighting system to emit light at a different one of the various up/down light-emission ratios.

4. The adjustable lighting system of claim 1 wherein:
    the reflective component is positioned vertically adjacent at least a portion of the light source; and
    the movable positioning apparatus is configured and arranged in the adjustable lighting system to, when moved, change a relative lateral positioning between the light source and the reflective component, for the adjustable lighting system to emit light at a different one of the various bi-directional light-emission ratios being various left/right light-emission ratios.

5. The adjustable lighting system of claim 1 wherein the movable positioning apparatus is configured and arranged in the adjustable lighting system to, when moved, change a relative rotational positioning between the light source and the reflective component, for the adjustable lighting system to emit light at a different one of the various bi-directional light-emission ratios.

6. The adjustable lighting system of claim 1 further comprising:
    a first lightguide comprising the first light-emitting surface and a second internal surface opposite the first light-emitting surface; and
    a second lightguide comprising the second light-emitting surface and a second internal surface opposite the second light-emitting surface;
    wherein the reflective component is positioned between the first and second internal surfaces.

7. The adjustable lighting system of claim 1 wherein:
    the light source is an edgelight; and
    the lightguide has a proximate edge positioned adjacent the edgelight to, in operation of the adjustable lighting system, transmit light from the edgelight out of the adjustable lighting system by way of the first emitting surface and the second emitting surface.

8. An adjustable lighting system, configured to emit light at any of various bi-directional light-emission ratios, comprising:
- a first lightguide having a first emitting surface opposite a first internal surface, and being configured to transmit light received at the first lightguide out of the adjustable lighting system by way of the upper emitting surface;
- a second lightguide having a second emitting surface opposite a second internal surface, and configured to transmit light received at the second lightguide out of the adjustable lighting system by way of the lower emitting surface;
- a light source;
- a reflective component positioned adjacent the light source and between the first and second internal surfaces to block light transmitting through the first lightguide from passing into the second lightguide and light transmitting through the second lightguide from passing into the first lightguide; and
- a movable positioning apparatus connected to the light source or the reflective component;
- wherein the movable positioning apparatus is configured to, when moved, change a relative positioning between the light source and the reflective component.

9. The adjustable lighting system of claim 8 wherein:
the reflective component is positioned laterally adjacent at least a portion of the light source; and
the various bi-directional light-emission ratios include various up/down light-emission ratios.

10. The adjustable lighting system of claim 8 wherein:
the reflective component is positioned vertically adjacent at least a portion of the light source; and
the various bi-directional light-emission ratios include left/right light-emission ratios.

11. The adjustable lighting system of claim 8 wherein the movable positioning apparatus is configured and arranged in the adjustable lighting system to, when moved, change a relative linear positioning between the light source and the reflective component, for the adjustable lighting system to emit light at a different one of the various bi-directional light-emission ratios.

12. The adjustable lighting system of claim 11 wherein the light source comprises plurality of lighting sections, and each one of the lighting sections can be positioned adjacent the reflective component based on the relative linear positioning.

13. The adjustable lighting system of claim 8 wherein the movable positioning apparatus is configured and arranged in the adjustable lighting system to, when moved, change a relative rotational positioning between the light source and the reflective component, for the adjustable lighting system to emit light at a different one of the various bi-directional light-emission ratios.

14. The adjustable lighting system of claim 13 wherein the light source comprises plurality of lighting sections, and each one of the lighting sections can be positioned adjacent the reflective component based on the relative rotational positioning.

15. An adjustable lighting system, configured to emit light at any of various bi-directional light-emission ratios, comprising:
- a unitary lightguide body including a light-guide material, a first light-emitting surface opposite a second light-emitting surface, and a reflective material positioned between the first and second light-emitting surfaces;
- a light source arranged adjacent the single lightguide; and
- a movable positioning apparatus connected to the light source or the unitary lightguide body;
- wherein the movable positioning apparatus is configured to, when moved, change a relative positioning between the light source and the reflective component, to produce a different one of the various bi-directional light-emission ratios.

16. The adjustable lighting system of claim 15 wherein:
the reflective component is positioned laterally adjacent at least a portion of the light source; and
the bi-directional light-emission ratios include various up/down light-emission ratios.

17. The adjustable lighting system of claim 15 wherein:
the reflective component is positioned vertically adjacent at least a portion of the light source; and
the various bi-directional light-emission ratios include various left/right light-emission ratios.

18. The adjustable lighting system of claim 15 wherein the movable positioning apparatus is configured and arranged in the adjustable lighting system to, when moved, change the relative positioning being a relative rotational positioning between the light source and the reflective component, to produce the different one of the various bi-directional light-emission ratios.

19. The adjustable lighting system of claim 15 wherein the lightguide comprises multiple rows of light-emitting diodes.

* * * * *